(12) United States Patent
Lonergan

(10) Patent No.: US 11,213,056 B2
(45) Date of Patent: Jan. 4, 2022

(54) SEASONED FOOD PRODUCT AND METHOD

(71) Applicant: Potandon Produce L.L.C., Idaho Falls, ID (US)

(72) Inventor: Dennis Lonergan, Long Lake, MN (US)

(73) Assignee: POTANDON PRODUCE L.L.C., Idaho Falls, ID (US)

( * ) Notice: Subject to any disclaimer, the term of this patent is extended or adjusted under 35 U.S.C. 154(b) by 260 days.

(21) Appl. No.: 15/606,559

(22) Filed: May 26, 2017

(65) Prior Publication Data

US 2017/0339988 A1 Nov. 30, 2017

Related U.S. Application Data

(60) Provisional application No. 62/342,407, filed on May 27, 2016.

(51) Int. Cl.
| | | |
|---|---|---|
| *A23L 5/10* | (2016.01) | |
| *B65D 81/34* | (2006.01) | |
| *A23L 19/12* | (2016.01) | |
| *A23L 5/30* | (2016.01) | |

(52) U.S. Cl.
CPC . *A23L 5/13* (2016.08); *A23L 5/15* (2016.08); *A23L 5/34* (2016.08); *A23L 19/12* (2016.08); *A23V 2002/00* (2013.01); *B65D 81/34* (2013.01); *B65D 2581/3427* (2013.01); *B65D 2581/3429* (2013.01); *B65D 2581/3437* (2013.01)

(58) Field of Classification Search
CPC ........ B65D 2581/34; B65D 81/34; A23L 5/13
USPC ................ 426/106–120, 392, 520, 637, 234, 426/241–243; 219/725–735
See application file for complete search history.

(56) References Cited

U.S. PATENT DOCUMENTS

| | | | | |
|---|---|---|---|---|
| 3,256,101 | A | | 6/1966 | Arns |
| 3,973,045 | A | | 8/1976 | Brandberg et al. |
| 4,038,425 | A | | 7/1977 | Brandberg et al. |
| 4,219,573 | A | | 8/1980 | Borek |
| 4,596,713 | A | * | 6/1986 | Burdette ............ B65D 81/3272 206/219 |
| 4,703,148 | A | | 10/1987 | Mukulski et al. |
| 4,942,277 | A | * | 7/1990 | Narberes ............ B65D 81/3453 209/235 |
| 6,333,059 | B1 | * | 12/2001 | Monsalve ............... A23L 7/183 426/107 |
| 6,607,764 | B1 | * | 8/2003 | Keller .................. B65D 77/225 426/107 |

(Continued)

FOREIGN PATENT DOCUMENTS

| | | | | |
|---|---|---|---|---|
| FR | 2892102 | A1 * | 4/2007 | ......... B65D 81/3461 |
| JP | 04117258 | A * | 4/1992 | |

OTHER PUBLICATIONS

Odell's Chef's Butter. Jan. 4, 2013. Retrieved from URL: <https://web.archive.org/web/20130104185101/http://www.ilovebutter.com/ilovebutter_whatclar.html>.*

(Continued)

*Primary Examiner* — Viren A Thakur
*Assistant Examiner* — Ashley Axtell
(74) *Attorney, Agent, or Firm* — McHale & Slavin, P.A.

(57) ABSTRACT

A packaged food product with a seasoning disk is provided. The food product includes potatoes. The seasoning disk includes seasoning and fat that is in solid form at the food product's anticipated normal storage temperature. The fat includes milkfat.

11 Claims, 2 Drawing Sheets

(56) References Cited

U.S. PATENT DOCUMENTS

| | | | | |
|---|---|---|---|---|
| 8,087,827 | B2* | 1/2012 | Mir | B65D 33/01 383/102 |
| 8,202,559 | B2* | 6/2012 | Leimkuhler | B65D 75/66 426/106 |
| 8,343,564 | B2* | 1/2013 | Kerr | A23B 7/0408 426/390 |
| 2005/0079252 | A1* | 4/2005 | Kendig | B65D 81/3266 426/125 |
| 2005/0211704 | A1* | 9/2005 | West | H05B 6/6494 219/734 |
| 2006/0233928 | A1* | 10/2006 | Wysocki | B65B 25/02 426/392 |
| 2007/0087096 | A1* | 4/2007 | Mir | B65D 33/01 426/415 |
| 2010/0255176 | A1* | 10/2010 | Kerr | A23B 7/0408 426/637 |

OTHER PUBLICATIONS

AMF Global Dairy Trade. Oct. 28, 2014. Retrieved from URL: <https://www.globaldairytrade.info/assets/Uploads/sellers/fonterra/AMF-Premium-210kg-AU.pdf?cb=1443728330>.*

Butter Potatoes. Allrecipes. Aug. 30, 2002. Retrieved from URL: <https://www.allrecipes.com/recipe/19861/butter-potatoes/>.*

Lindsey Gremont, How to Make Flavored Ghee Infusions. Feb. 5, 2013. Retrieved from URL :<https://www.homemademommy.net/2013/02/how-to-make-flavored-ghee-infusions-indian-spiced-herbs-de-provence-chile-ghee.html>.*

Herbed Butter or Ghee. The Whole Smiths. Feb. 26, 2015. Retrieved from URL: <https://www.thewholesmiths.com/2015/02/26/herbed-butter-or-ghee/>.*

What is Water Activity. Jun. 17, 2004. Retrieved from URL: <http://www.adiveter.com/ftp_public/articulo815.pdf>.*

Water Activity in Foods. Safefood360. 2014. Retrieved from URL: <http://safefood360.com/resources/Water-Activity.pdf>.*

Fundamentals of Water Activity. Decagon Devices. 2006. Retrieved from URL: <https://www.graintec.com.au/media/12856/Fundamentals.pdf>.*

Ghee Organic. Satnam.eu Jul. 19, 2014. Retrieved from URL: <https://web.archive.org/web/20140719083415/https://www.satnam.eu/ghee-organic-in-bioland-quality-5-kg-bucket-p-3631.html>.*

Ganguli et al. Ghee: Its Chemistry, Processing and Technology. Journal of Dairy Science. Jan. 1973. Retrieved from URL: <https://eurekamag.com/research/000/102/000102820.php>.*

JP 04117258 Espacenet Translation.*

Zagare, Manjushri. Environmental Impact Studies on Microbial Quality of Dairy Pack Food. Oct. 13, 2014. Chapter 3, p. 111. Table 1 . URL: http://shodhganga.inflibnet.ac.in:8080/jspui/handle/10603/83948, http://shodhganga.inflibnet.ac.in:8080/jspui/bitstream/10603/83948/13/13_%20chapter%203.pdf.*

Sainsburys. Jun. 7, 2011. Retrieved from URL: https://www.flickr.com/photos/51282757@N05/5809911886.*

Disk Definition. Google. May 26, 2015. Retrieved from URL:<https://www.google.com/search?q=disk+definition&rlz=1C1GCEA_enUS796US796&source=lnt&tbs=cdr%3A1%2Ccd_min%3A%2Ccd_max%3A5%2F26%2F2017&tbm=>.*

Proper Environment for Potato Storage. The University of California. Jun. 26, 2011 Retrieved from URL :<https://web.archive.org/web/20110626080927/https://vric.ucdavis.edu/pdf/POTATOES/potato_storage.pdf>.*

Options for Storing Potatoes at Home. University of Idaho Extension. 2009. Retrieved from URL: <https://www.extension.uidaho.edu/publishing/pdf/CIS/CIS1153.pdf>.*

Vegetable Definition Merriam Webster Dicitonary. Aug. 25, 2014. Retrieved from URL: <https://web.archive.org/web/20140825175032/http://www.merriam-webster.com/dictionary/vegetable>.*

FR 2892102 Espacenet Translation.*

Fr 2892102A USPTO Translation, publication date Apr. 20, 2007.*

JP H04117258A USPTO Translation, publication date Apr. 17, 1992.*

Thickening Spices and Ingredients. Nov. 12, 2015. Retrieved from URL:<https://web.archive.org/web/20151112231121/http://www.myspicer.com/product-category/thickening>.*

* cited by examiner

SEASONED FOOD PRODUCT AND METHOD

CROSS REFERENCE TO RELATED APPLICATIONS

In accordance with 37 C.F.R. 1.76, a claim of priority is included in an Application Data Sheet filed concurrently herewith. Accordingly, the present invention claims priority under 35 U.S.C. § 119(e) to U.S. Provisional Application 62/342,407 entitled "SEASONED FOOD PRODUCT AND METHOD" filed on May 27, 2016. The contents of the above referenced application are herein incorporated by reference in its entirety.

FIELD OF THE INVENTION

The present invention relates to a packaged tuber food product that contains a fat based seasoning disk that is stable during shipment and storage of the product. When the food product and disk are heated for cooking the food product, the fat liquefies, allowing the fat and seasoning contained within the disk to coat at least a portion of the tubers.

BACKGROUND OF THE INVENTION

An important aspect of food for human consumption is to have it convenient for preparation. Another important aspect of food is to provide seasoning for the food to enhance its organoleptic properties for consumption. It is known in the art to provide packaged food products with seasoning sold with the food product, typically in packets, for application to the food just prior to consumption. The seasoning in the packets has typically been in dry form. However, the adhesion of the seasoning to the food may not be adequate to maintain the seasoning in contact with the food, wherein the effectiveness of the seasoning is reduced or additional seasoning needs to be provided to obtain the desired level of seasoning impact.

It is also desirable to have food products that are shelf stable. Storage of food at refrigerated temperatures is both costly and inconvenient. The requirement for refrigerated storage limits how and where a product can be displayed for sale. Fresh whole potatoes can be displayed on non refrigerated counters and can be stored in the storeroom in the back of the store outside of expensive refrigerators. They can also be displayed in a non produce section of a store if shelf stable. Additional problems with typical potatoes is the time required to cook them, even in a microwave oven, and they are not uniform in weight and must be weighed individually for sale because they are sold by the pound, leaving a consumer in doubt as to cost and quantity. When packaged, fresh potatoes are often stored in ventilated polymeric bags to allow for oxygen migration to reduce the risk of the inside of the bag becoming anaerobic spoiling the product. Ventilated bags, though, limit the ability of particulates like herbs and spices being provided in the bags. Ventilated bags also allow moisture migration that can damage some herbs and spices. Fresh potatoes also need to "breathe" air for oxygen exchange for extended shelf life.

SUMMARY OF THE INVENTION

The present invention involves the provision of a packaged food product that is to be heated prior to consumption as, for example, in a microwave oven. The food product is provided with a solid disk containing fat and seasoning that, when heated, the fat liquefies, allowing the seasoning contained therein to be distributed on the food product.

Accordingly, it is a primary objective of the instant invention to provide a packaged food product that allows distribution of seasoning onto the food product after heating of the food product.

It is a further objective of the instant invention to provide a seasoning component that is encapsulated in a solid fat disk during storage of the packaged food product.

It is yet another objective of the instant invention to provide a food product wherein the packaged food product is stored at ambient temperature of less than about 80° F.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
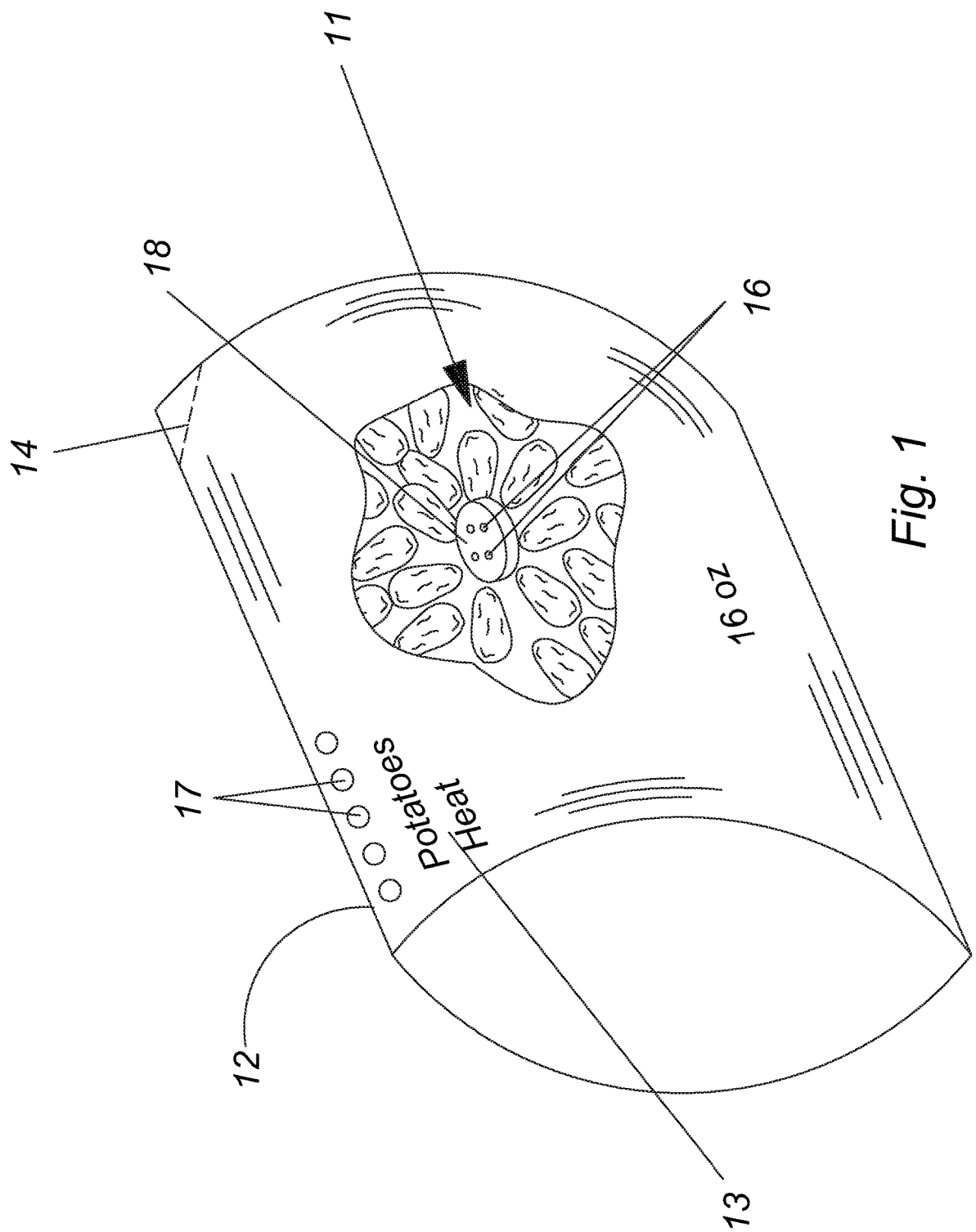
FIG. 1 is a side elevation view of the packaged food product having a solid form seasoning disk.

FIG. 1 illustrates a food product designated generally 11 contained in a package designated generally 12. The food product 11 is a plurality of whole potatoes with peel. For purposes of this application, a potato is a starchy tuberous crop from the perennial nightshade family having a botanical name *Solanum tuberosum* L. Further, a potato is the tuberous portion of the plant. In a preferred embodiment, the food product 11 is a plurality of small whole unpeeled fresh potatoes as, for example, sized to provide about 10-35 potatoes per pound. A preferred quantity of food product 11 in a package 12 is in the range of between about 0.5 pounds and about 2 pounds and, more preferably, on the order of about 1 pound.

The package 12 can be any suitable package adapted for storage of the food product 11 and heating of the food product and seasoning disk 15 therein. The package 12 is substantially closed and has a storage chamber 16. This can be in the form of a clear polymeric material with or without means 14, such as a perforated line, to effect opening thereof without a tool such as a knife or scissors. Such packages are well known in the art and may be made from polyethylene, polypropylene or other food acceptable material. The package 12 can be an internal package, and can be contained in an outer package 14. The package 12, or an outer package 14, can contain suitable graphics, branding, labeling information and preparation instructions 13 as are also well known in the art. The package 12 is ventilated to allow air/oxygen to transfer from the outer environment to the inside of the package. This can be accomplished by using a perforated material to form the package 12, for example, perforations 17 on the order of 0.002 square inches or smaller (0.050 inch diameter holes or smaller equivalent). What is meant by "substantially closed" is that the package is ventilated as described, but will retain generated steam to expand the package. The package may also be made from an oxygen permeable material as is known in the art. The permeability is adequate to preclude the ingress to the package interior of detrimental solids.

Contained within the package 12 is the seasoning disk 15. The disk 15 can be any suitable shape and size, with the particular of a disk and its components being disclosed below. The disk 15 has two major components, a seasoning component designated generally 16 and a carrier component designated generally 18. The seasoning 16 can include such things as spices and herbs, for example parsley, oregano, basil, rosemary, thyme, and savory dried vegetables such as red, green and yellow peppers, onion and garlic, and salt and ground black pepper. Natural and artificial flavors can also be included with the other seasoning components. The spice and or herbs and other seasoning components are preferably dry (typically less than about 10% by weight water) and in particulate form. The seasoning 16 is mixed into the carrier 18 and is preferably present in an amount in the range of between about 1 gram and about 5 grams per pound of food product 11. The ratio of seasoning to carrier is in the range of between about 25:75 percent by weight and about 75:25 percent by weight, and preferably about 50:50 percent by weight. Surprisingly, it has been observed that inclusion of particulate matter (e.g., the spices and/or herbs), beneficially increases the physical rigidity of the seasoning disk 15, as compared to a disk which was composed solely of the fat.

The carrier 18 includes a fat component that has a substantial amount of fat, which allows it to form a disk 15 containing the seasoning 16 that physically is in solid form at 80° F. (26.6° C.) and cooler. Being in solid form does not preclude some of the fat in the disk from being liquid. Preferably, the carrier is at least about 99% by weight fat. The fat component of the disk 15 is substantially water free and is a continuous phase of the disk 15. In a preferred embodiment, the fat is an anhydrous fat containing at least about 99% by weight fat, and preferably at least about 99.5% fat. The fat component contains less than about 1% by weight water by weight of fat plus water. The fat is also crystalline. For flavor purposes, a preferred fat is milkfat, known commonly as butter. At least 50% by weight of the flit is milkfat; preferably at least about 95% by weight of the fat is milkfat, and most preferably substantially all milkfat. Anhydrous butter, by Codex definition, contains at least 99.8% by weight milkfat and is derived from fresh cream or butter. By some definitions, anhydrous butter is not allowed to have additives, but is not so limited with the present invention. Butter can be made in a manner with alkali to neutralize free fatty acids. Typically, butters are made from cow's milk, but can be derived from other animal's milk. The weight of the disk 15 or plurality of disks in a package 12 is preferably in the range of between about 1 gram and about 10 grams per pound of product 11. The fat component preferably has a solids fat index (SF1) (%) of about at: 10.0° C. 33.0-21.1° C. 14.0-26.7° C. 10.0-33.3° C. 3.0-40.0° C. 0 as measured by Nuclear Magnetic Resonance or dilatometry, both well known in the art. It is to be understood that a plurality of disks 15 may be used if desired.

The seasoning disk 15 with fat and seasoning has a water activity ($A_w$) of less than 0.5, well below that of regular butter, which is about 0.95. Disks 15 of the present invention with the seasoning included have $A_w$ in the range of between about 0.22 and about 0.36 when measured at 25° C. Water activity, or is the partial vapor pressure of water in a substance divided by the standard state partial vapor pressure of water. In the field of food science, the standard state is most often defined as the partial vapor pressure of pure water at the same temperature. The $A_w$ of the disk 15 will differ depending on the ingredients added to the fat component of the carrier 18.

The packaged food product 11 is stored at a temperature of less than about 80° F., and can be stored refrigerated if desired. Refrigerated storage for produce is typically between about 40° F. and about 50° F. In use, the packaged food product 11 is removed from storage and can be immediately heated or allowed to warm, for example, come to room temperature, prior to heating. Preparation instructions can be provided on the package 12 regarding representative cooking times to effect cooking of the food product 11. Preferably, the heating/cooking is done in a microwave oven. A portion of the steam is retained in the storage chamber 16 or 53 during heating of the disk 15 and food product 11. However, venting of the package 12 is desired to prevent excessive pressure buildup in the package during product heating. Venting can be provided by package perforations 17 or by piercing or cutting the package 12 prior to heating.

As seen in the Figures, the seasoning disk 15 can be placed on the top of the food product 11. Its size resists it from moving into the food product 11 during storage. Surprisingly, during heating of the food product 11, the disk 15 disperses and does not require later mixing. However, turning the package over after heating can be done by the consumer to help distribute the disk components. While not being bound by this theory, it is believed that the steam generated from the food product during heating thereof effects dispersion of the melted disk onto the plurality of individual food pieces. Hot water does not effect such dispersion.

Figure 2:
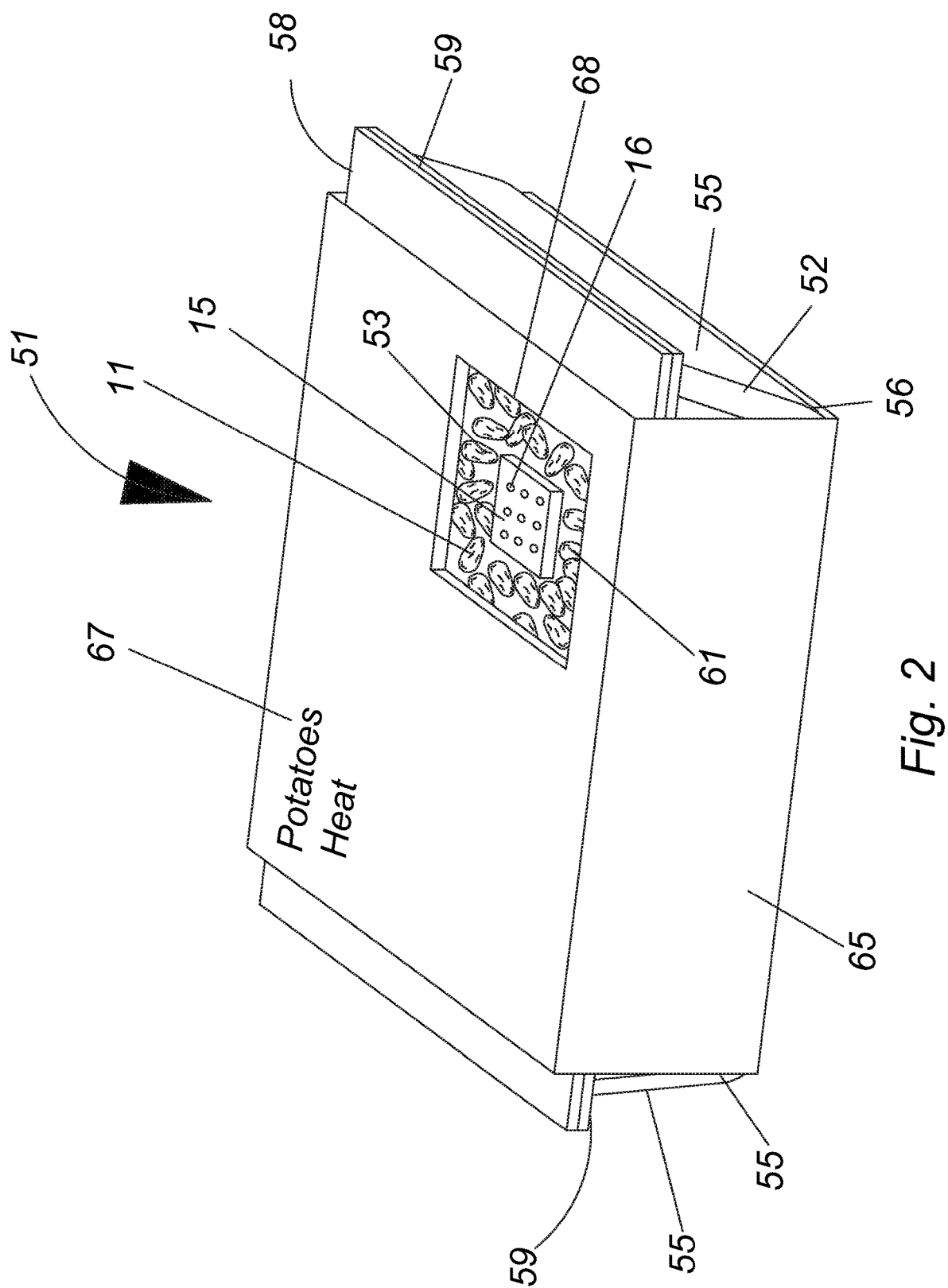
FIG. 2 is a perspective view of an alternate package for the food product.

FIG. 2 shows an alternate food package 51 that is also substantially closed. It includes a tray 52 having a storage chamber 53 defined by a plurality of connected sidewalk 55 and a connected bottom wall 56. A cover 58, such as a clear film, is secured to a flange 59 extending from the sidewalks 55 at an open top 61 to the chamber 53. The securement can be by heat sealing, which can be accomplished to allow the cover 58 to be separated from the tray 52 by peeling off. The tray 52 and/or cover 58 can be permeable as described above. The seasoning disk 15 can be positioned on top of individual food pieces comprising the food product 11. A sleeve 65 can be provided for containing the filled and sealed tray 52. Graphics and instructions 67 can provided on the exterior of the sleeve 65. The sleeve 65 can also be provided with a cut out window 68 for viewing of the product through transparent film of the cover 58. It is to be understood that the disk 15 can be in a separate part of the package 12, separated from the food product 11 if desired. It can be added to the package area containing the food product 11 by the consumer, or can be separated from the food product by a barrier that allows the disk 15 to contact the food product 11 when the barrier is heated during the cooking process.

In use, the package 12 or 51 containing the food product 11 is stored at the appropriate temperature and is shelf stable. For consumption, the package 12 with the contained food product 11 and seasoning disk 15 is placed in the heating device, for example a microwave oven, with the disk 15 on top of the food product 11, and heated for the desired time effective to generate steam to fill the package 12. After the desired amount of heating/cooking, the package 12 can be shaken to effect additional distribution of the carrier 18 and seasoning 16 on the food product 11 if needed. After this, the package 12 can be opened and the food product 11 removed and consumed. It has been found that a cook time of about 5 minutes is effective for 1 pound of potatoes in a 1000 watt oven.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A shelf stable packaged food product for heating in a microwave oven, the food product comprising:
   a substantially closed package with a storage chamber, said substantially closed package being vented to relieve pressure in the storage chamber during microwave heating;
   a plurality of fresh potatoes in said storage chamber with said plurality of fresh potatoes including whole unpeeled potatoes sized to provide 10 to 35 potatoes per pound of potatoes; and
   at least one fat containing disk in solid form when at 80° F. and having a weight of 1 gram to 10 grams per pound of potatoes,
said at least one fat containing disk comprising a seasoning component and a carrier component, said at least one fat containing disk comprises 25 wt % to 75 wt % of the carrier component, wherein the carrier component contains at least 99.5% milkfat and the seasoning component comprises at least one seasoning in particulate form mixed in the carrier component, said at least one fat containing disk being contained in said substantially closed package with said plurality of fresh potatoes, said at least one fat containing disk being contained in the substantially closed package in a manner that the carrier component of said at least one fat containing disk will come into contact with the plurality of fresh potatoes during heating of said shelf stable packaged food product.

2. The food product of claim 1 wherein the at least one fat containing disk is positioned on top of the plurality of fresh potatoes and in contact therewith during storage.

3. The food product of claim 1 wherein the at least one fat containing disk has a water activity of less than about 0.5.

4. The food product of claim 3 wherein the milkfat is crystalline fat.

5. The food product of claim 3 wherein the substantially closed package includes a clear portion for viewing of the food product.

6. The food product of claim 3 wherein the at least one fat containing disk contains the seasoning component in a ratio of the seasoning component to the carrier component of 25:75 to 75:25 weight percent.

7. The food product of claim 1 wherein said at least one fat containing disk is separated from said plurality of fresh potatoes by a barrier that allows said at least one fat containing disk to contact said plurality of fresh potatoes when said barrier is heated during heating of said substantially closed package.

8. A method of cooking potatoes, the method comprising:
   providing a plurality of fresh potatoes in a substantially sealed package with a storage chamber, said plurality of fresh potatoes being sized to provide 10 to 35 potatoes per pound of potatoes;
   providing at least one fat containing disk in solid form when at 80° F. and having a weight of 1 gram to 10 grams per pound of potatoes, said at least one fat containing disk comprising a seasoning component and a carrier component, said at least one fat containing disk comprises 25 wt % to 75 wt % of the carrier component, wherein the carrier component contains at least 99.5% crystalline milkfat and the seasoning component comprises at least one seasoning in particulate form mixed in the carrier component, said at least one fat containing disk being contained in said substantially sealed package in a manner that it will come into contact with the plurality of fresh potatoes during heating of the substantially sealed package; and heating said plurality of fresh potatoes and said at least one fat containing disk in a microwave oven in the substantially sealed package and generating steam and retaining a portion of the generated steam in the storage chamber until said at least one fat containing disk is melted and the plurality of fresh potatoes are heated.

9. The method of claim 8 wherein the at least one fat containing disk is separated from the plurality of fresh potatoes by a barrier that allows the at least one fat containing disk to contact the plurality of fresh potatoes when the barrier is heated during heating of the substantially sealed package.

10. A shelf stable packaged food product for heating in a microwave oven, the food product comprising:
    a substantially closed package with a storage chamber;
    a plurality of fresh potatoes in said substantially closed package storage chamber with said plurality of fresh potatoes including whole unpeeled potatoes sized to provide at least 10 potatoes per pound of potatoes; and
    at least one fat containing disk in solid form when at 80° F. and having a weight of at least 1 gram per pound of potatoes, said at least one fat containing disk comprising a seasoning component and a carrier component, said at least one fat containing disk comprising 25 wt % to 75 wt % of the carrier component, wherein the carrier component contains at least 99.5% milkfat and the seasoning component comprises at least one seasoning in particulate form mixed in the carrier component, said at least one fat containing disk being contained in said substantially closed package with said plurality of fresh potatoes, said at least one fat containing disk being contained in the substantially closed package in a manner that the carrier component of said at least one fat containing disk will come into contact with the plurality of fresh potatoes during heating of said substantially closed package.

11. A method of cooking potatoes, the method comprising:
- providing a plurality of fresh potatoes in a substantially sealed package with a storage chamber, said plurality of fresh potatoes being sized to provide at least 10 potatoes per pound of potatoes;
- providing at least one fat containing disk in solid form when at 80° F. and having a weight of at least 1 gram per pound of potatoes, said at least one fat containing disk comprising a seasoning component and a carrier component, said at least one fat containing disk comprising 25 wt % to 75 wt % of the carrier component, wherein the carrier component contains at least 99.5% milkfat and the seasoning component comprises at least one seasoning in particulate form mixed in the carrier component, said at least one fat containing disk being contained in said substantially sealed package in a manner that it will come into contact with the plurality of fresh potatoes during heating of the substantially sealed package; and
- heating the substantially sealed package in a microwave and generating steam and retaining a portion of the generated steam in the storage chamber until said at least one fat containing disk is melted and the plurality of fresh potatoes are heated.

* * * * *